(12) United States Patent
Chou

(10) Patent No.: US 9,725,029 B2
(45) Date of Patent: Aug. 8, 2017

(54) RATCHET STRAP TIGHTENER

(75) Inventor: Yeh-Chien Chou, Taoyuan County (TW)

(73) Assignee: The Ratchet Depot, Inc., Piedmont, SC (US)

( * ) Notice: Subject to any disclaimer, the term of this patent is extended or adjusted under 35 U.S.C. 154(b) by 542 days.

(21) Appl. No.: 13/047,802

(22) Filed: Mar. 15, 2011

(65) Prior Publication Data

US 2012/0233823 A1 Sep. 20, 2012

(51) Int. Cl.
*B60P 7/00* (2006.01)
*B60P 7/08* (2006.01)

(52) U.S. Cl.
CPC .............. *B60P 7/083* (2013.01); *B60P 7/0846* (2013.01); *Y10T 24/2175* (2015.01)

(58) Field of Classification Search
CPC ..... B60P 7/083; B60P 7/0846; Y10T 24/2175
USPC ................ 24/68 CD, 68 E, 68 R, 68 D, 909; 410/96, 101, 103; 254/218, 217, 222, 254/223, 238, 239, 243; 242/388, 388.1, 242/388.2, 388.3, 388.4
See application file for complete search history.

(56) References Cited

U.S. PATENT DOCUMENTS

| | | | | |
|---|---|---|---|---|
| 2,874,431 A * | 2/1959 | Elsner | .............................. | 24/318 |
| 5,855,045 A * | 1/1999 | Miura | ......................... | 24/68 CD |
| 6,007,053 A * | 12/1999 | Huang | ........................... | 254/247 |
| 6,457,701 B1 | 10/2002 | Huang | | |
| 6,641,116 B1 * | 11/2003 | Huang | ........................... | 254/218 |
| 7,350,767 B2 * | 4/2008 | Huang | ........................... | 254/218 |
| 7,350,768 B1 * | 4/2008 | Chang | ........................... | 254/218 |
| 8,209,821 B1 * | 7/2012 | Chen | ........................... | 24/68 CD |
| 2002/0153518 A1* | 10/2002 | Huang | .................... | B60P 7/083 254/223 |
| 2004/0042197 A1* | 3/2004 | Wu | ......................... | B60P 7/083 362/84 |
| 2005/0087730 A1* | 4/2005 | Hu | ................. | 254/218 |
| 2007/0056146 A1* | 3/2007 | Madachy | .............. | B60P 7/0846 24/68 CD |
| 2007/0122247 A1* | 5/2007 | Madachy | .............. | B60P 7/0846 410/100 |
| 2007/0189873 A1* | 8/2007 | Breeden | ........................ | 410/100 |
| 2008/0148537 A1* | 6/2008 | Huang | ........................ | 24/68 CD |
| 2008/0189921 A1* | 8/2008 | Tomosue | ................. | B60P 7/083 24/68 R |
| 2008/0216294 A1* | 9/2008 | Mamie | ........................ | 24/68 CD |
| 2008/0307618 A1* | 12/2008 | Huang | ........................ | 24/68 CD |
| 2009/0047091 A1* | 2/2009 | Huck | ............................ | 410/100 |

* cited by examiner

*Primary Examiner* — Emmanuel M Marcelo
(74) *Attorney, Agent, or Firm* — John B. Hardaway, III; Nexsen Pruet, LLC

(57) ABSTRACT

A strap tightener for securing cargo is disclosed. The tightener includes a base frame and a handling frame, which pivotally connect to form a vee structure. The base frame is connected to the handling frame by inserting a pivot into pivot hole thereof. Each of two ends of the pivot is ringed with a protection loop and a ratchet wheel. The protection loop is composed of a flange for being blockedly fixed on the pivot hole and a sleeve for penetrating into the pivot hole. The sleeve can protect the pivot hole to prevent it from being directly pressed by the pivot.

5 Claims, 4 Drawing Sheets

RATCHET STRAP TIGHTENER

BACKGROUND OF THE INVENTION

1. Technical Field

The invention relates to straps for securing cargo, particularly to tighteners for tightening the straps.

2. Related Art

Cargo on a flatbed truck must be secured by straps for transportation, and the straps must be tightened by ratchet tighteners. A ratchet strap tightener can unidirectionally and laborsavingly strain a strap and prevent it from loosing.

A typically conventional ratchet strap tightener as shown in U.S. Pat. No. 6,457,701 is a swingably vee structure composed of a base frame 11 and a handling frame 21. The base frame 11 and handling frame are separately provided with pivot holes for being penetrated by a pivot 23. Two ends of the pivot 23 are separately ringed with two ratchet wheels 22 so that the pivot 23 can synchronously rotate with the ratchet wheels 22. As can be seen in the drawings of '701, the pivot 23 is in direct contact with edges of the pivot holes. The pivot 23 is connectedly rotated by wrenching the handling frame 21 for winding and straining the strap 100. After the strap 100 has been strained, the tension of the strap 100 will be exerted on the pivot 23 and finally bear against the edges of the pivot holes. However, the base frame 11 is composed of metal plates, so its strength is limited. The pivot holes tend to be deformed by pressure exerted by the pivot 23 in long-term use. Once the pivot holes are deformed, the pivot 23 will be stuck in the pivot holes and hard to or even unable to rotate. As a result, the strap 100 cannot be released. This is a primary problem of the conventional strap tighteners.

SUMMARY OF THE INVENTION

An object of the invention is to provide a ratchet strap tightener which is arranged with a pivot hole protector for increasing strength of edges of pivot holes and making the pivot in out of contact with the pivot holes. This can prevent the pivot holes from being deformed to keep the pivot rotatable.

To accomplish the above object, the strap tightener of the invention includes a base frame and a handling frame, which pivotally connect to form a vee structure. The base frame is connected to the handling frame by inserting a pivot into pivot hole thereof. Each of two ends of the pivot is ringed with a protection loop and a ratchet wheel. The protection loop is composed of a flange for being blockedly fixed on the pivot hole and a sleeve for penetrating into the pivot hole. The sleeve can protect the pivot hole to prevent it from being directly pressed by the pivot.

DETAILED DESCRIPTION OF THE INVENTION

Figure 1:
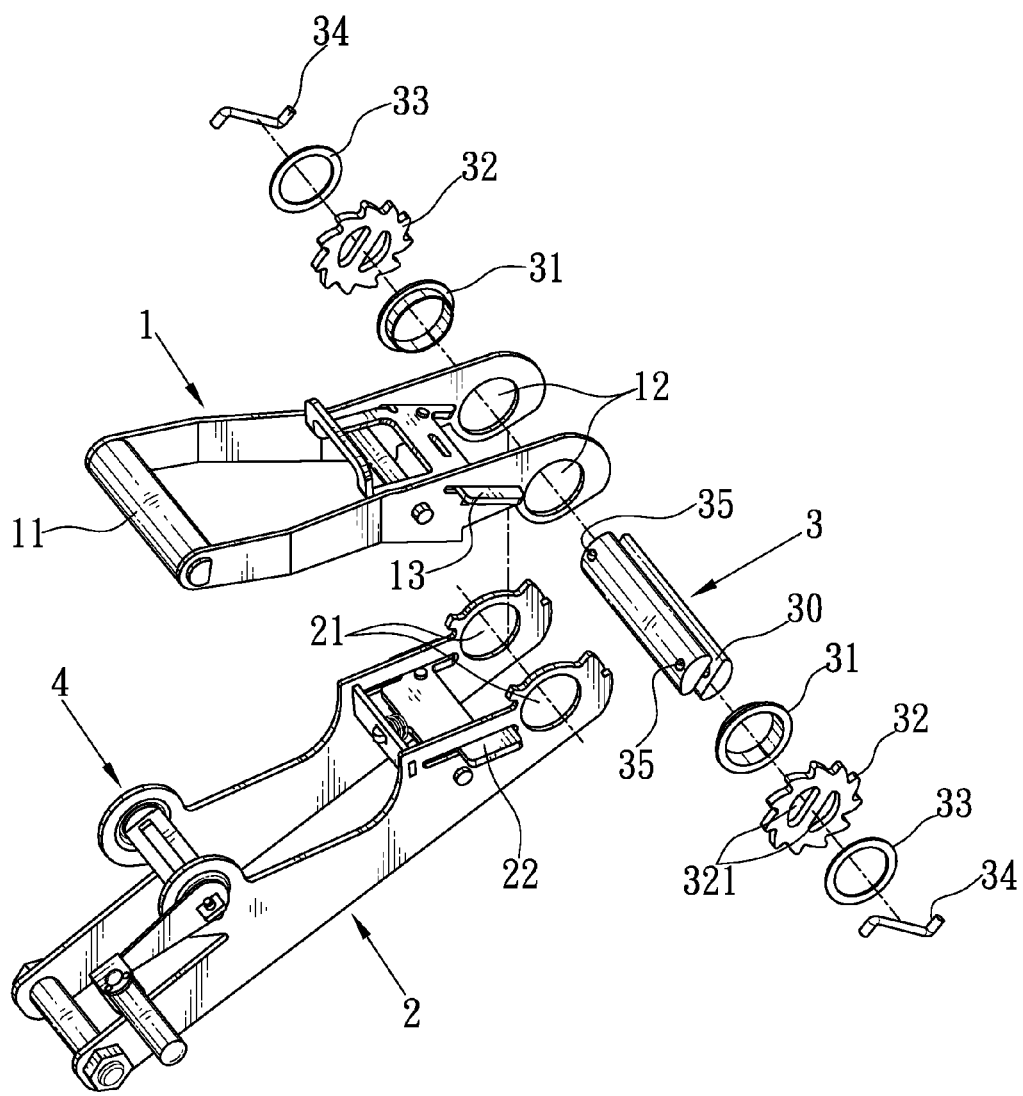
FIG. 1 is a perspective view of the invention.

Please refer to FIG. 1. The strap tightener of the invention is a vee structure composed of a base frame 2 and a handling frame 1. Each of the base frame 2 and handling frame 1 has a U-shaped cross-section. One end of the handling frame 1 is provided with a grip 11 for being held by a user. An end of the base frame 2 and the other end of the handling frame 1 are provided with a first pivot hole 21 and a second pivot hole 12, respectively. These pivot holes 21, 12 are circular in shape and corresponding to each other and have substantially identical diameters for being penetrated through by a pivot 3. As a result, the base frame 2 is pivotally connected with the handling frame 1.

Figure 2:
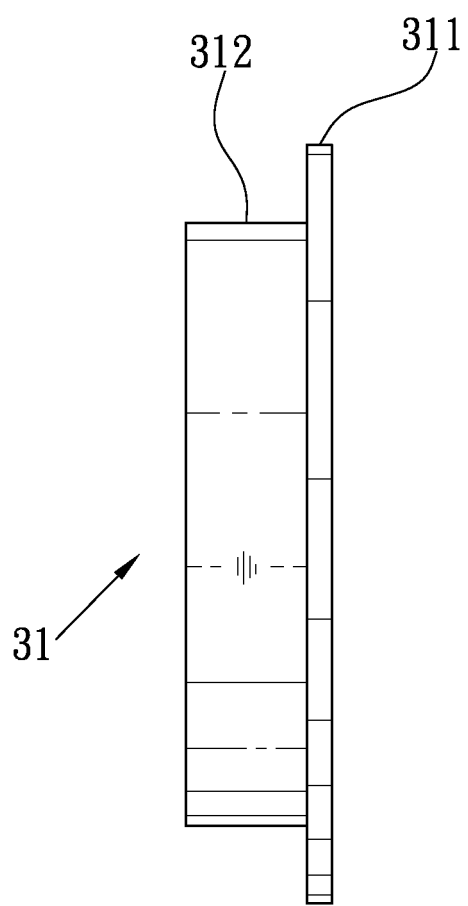
FIG. 2 is a side plan view of the protection loop of the invention.
Figure 3:
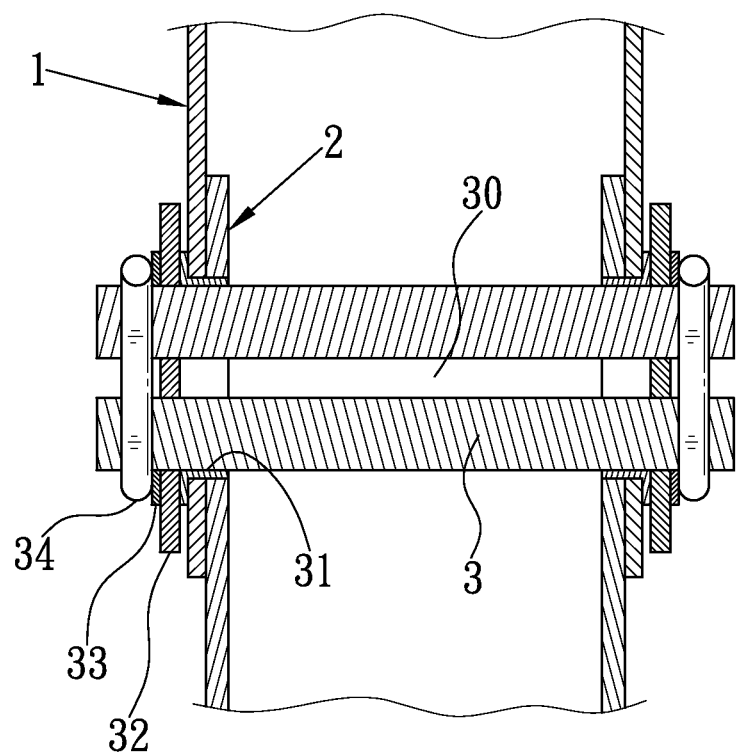
FIG. 3 is a partially cross-sectional view of the invention.

The pivot 3 is a cylinder in appearance and is formed with a winding slot 30 for being inserted by a strap (not shown). Each of two ends of the pivot 3 is ringed with a protection loop 31, a ratchet wheel 32, a washer 33 and a pin 34. Please further refer to FIGS. 2 and 3. The protection loop 31 is composed of a flange 311 and a sleeve 312. The flange 311 is blockedly fixed on an edge of the second pivot hole 12 and is sandwiched between the handling frame 1 and ratchet wheel 32. The sleeve 312 of the protection loop 31 penetrates into the first pivot hole 21 and second pivot hole 12. The sleeve 312 is sandwiched between the pivot 3 and overlapping pivot holes 21, 12 to serve as a protector to the pivot holes 21, 12. The edges of the pivot holes 21, 12 can be reinforced by the sleeve 312 and prevented from being deformed by direct contact with the pivot 3

Please refer back to FIG. 1. The ratchet wheel 32 is formed with a fixing hole 321 corresponding to the shape of cross-section of the pivot 3. Thus the ratchet wheel 32 is ringedly fixed on the pivot 3 to be synchronously rotatable with the pivot 3. Two ends of the pivot 3 are separately provided with two through holes 35 for being passed through by the pin 34 so that the ratchet wheel 32 and protection loop 31 can be fixed. The washer 33 is sandwich between the pin 34 and ratchet wheel 32. The pivot 3 is assembled with the other components by the pin 34.

Figure 4:
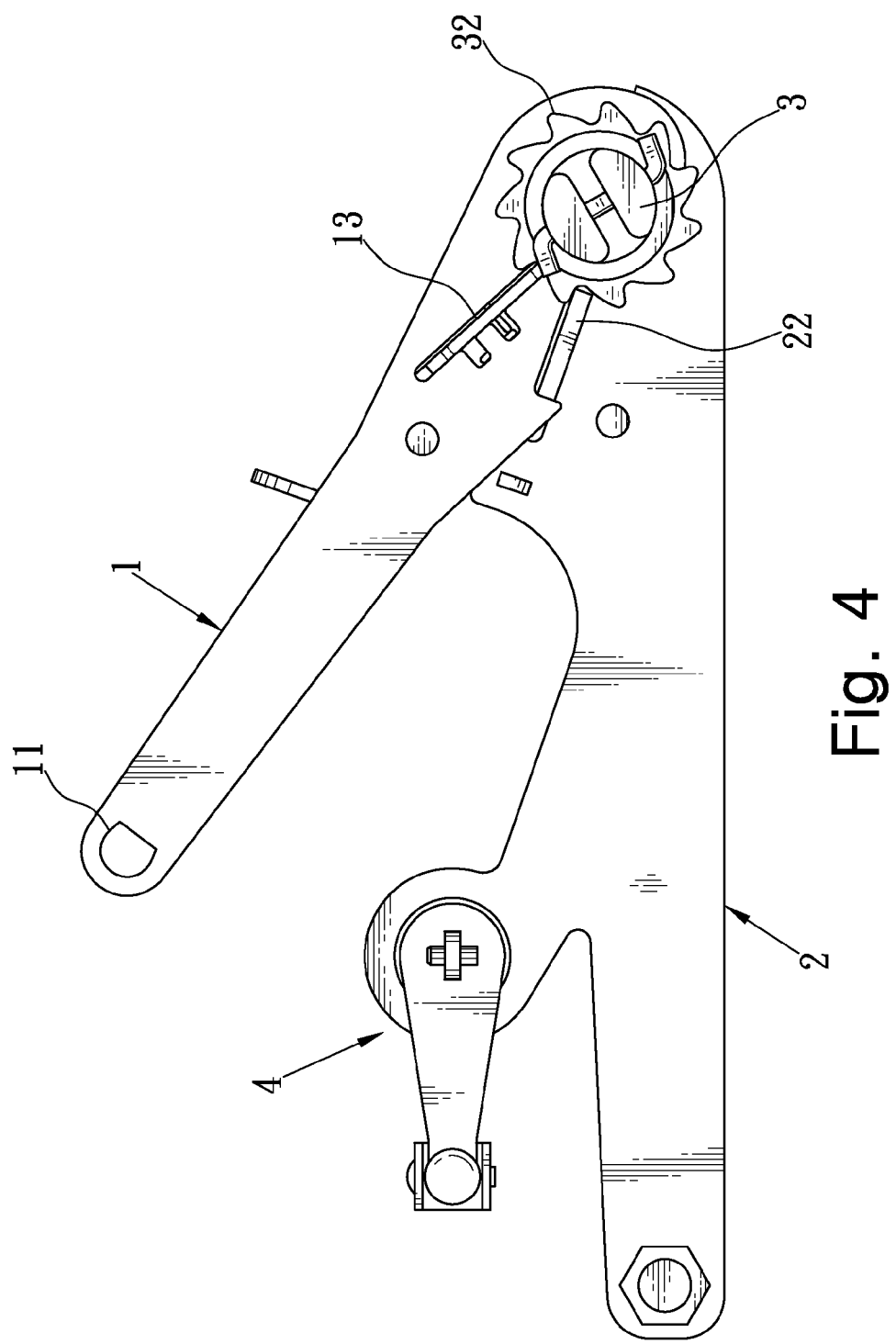
FIG. 4 is a side plan view of the invention.

Please refer to FIG. 4. The handling frame 1 is provided with a pushing plate 13 near the second pivot hole 12, which is flexibly retractable. The base frame 2 is provided with a pawl plate 22 near the first pivot hole 21, which is also flexibly retractable. Teeth of the ratchet wheel 32 are normally inserted by the pushing plate 13 and pawl plate 22. The pushing plate 13 pushes the ratchet wheel 32 and pivot 3 to synchronously rotate when the grip 11 of the handling frame 1 is wrenched outwards. The pivot 3 will not rotate because of the unidirectional effect of the ratchet wheel 32 when the handling frame 1 is wrenched inwards. Thereby, the pivot 3 may only be unidirectionally rotated to strain the strap. Besides, there is a winder 4 for winding another strap.

The exemplary embodiment shown in the drawings is a framework of the handling frame 1 overlapping outside the base frame 2. However, the handling 1 overlapping inside the base frame 2 is also available. The invention may be applied in these two frameworks without any substantial difference.

It will be appreciated by persons skilled in the art that the above embodiment has been described by way of example only and not in any limitative sense, and that various alterations and modifications are possible without departure from the scope of the invention as defined by the appended claims. It will be appreciated by persons skilled in the art that the above embodiment has been described by way of example only and not in any limitative sense, and that various alterations and modifications are possible without departure from the scope of the invention as defined by the appended claims.

What is claimed is:

1. A ratchet strap tightener comprising:

a base frame having a first circular pivot hole;

a handling frame having a second circular pivot hole, wherein the first circular pivot hole and the second circular pivot hole are penetrated through by a pivot, comprised of two separate hemispherical pieces which together form a solid cylindrical shape, to pivotally connect the handling frame to the base frame;

a ratchet wheel, formed with a fixing hole, ringedly fixed around the pivot by the fixing hole which is configured to correspond to a cross-sectional shape of the two separate hemispherical pieces of the pivot; and a circular protection loop, ringed on the pivot and having a circular sleeve, wherein the sleeve penetrates into the first circular pivot hole and the second circular pivot hole from outside the handling frame and is sandwiched between the pivot and edges of the first circular pivot hole and the second circular pivot hole, said circular protection loop being otherwise unattached to said first and second circular pivot holes and free to rotate with said pivot and said ratchet wheel;

fixing pins;

said pivot having through holes at either end thereof receiving said fixing pins to fix both said ratchet wheel and said circular protection loop in place for synchronous rotation with said pivot.

2. The ratchet strap tightener of claim 1, wherein the circular protection loop further comprises a flange sandwiched between the ratchet wheel and the handling frame or the base frame.

3. The ratchet strap tightener of claim 1, wherein the first circular pivot hole and the second circular pivot hole are have substantially identical diameters.

4. The ratchet strap tightener of claim 1, further comprising a winding slot formed and defined by a gap between the hemispherical pieces for passage of a strap therethrough.

5. The ratchet strap tightener of claim 4, wherein each of the two hemispherical pieces includes a flat surface, where the flat surfaces face each other, to form two sides of the winding slot.

\* \* \* \* \*